United States Patent
Urban et al.

(10) Patent No.: US 9,273,708 B2
(45) Date of Patent: Mar. 1, 2016

(54) HOLDER FOR A PROFILED RAIL

(71) Applicant: SCHLETTER GMBH, Kirchdorf (DE)

(72) Inventors: Hans Urban, Haag (DE); Dieter Fluhrer, Reichertsheim (DE)

(73) Assignee: SCHLETTER GMBH, Kirchdorf (DE)

( * ) Notice: Subject to any disclaimer, the term of this patent is extended or adjusted under 35 U.S.C. 154(b) by 0 days.

(21) Appl. No.: 14/407,071

(22) PCT Filed: Jun. 13, 2013

(86) PCT No.: PCT/DE2013/000315
§ 371 (c)(1),
(2) Date: Jun. 24, 2015

(87) PCT Pub. No.: WO2013/185747
PCT Pub. Date: Dec. 19, 2013

(65) Prior Publication Data
US 2015/0316086 A1 Nov. 5, 2015

(30) Foreign Application Priority Data

Jun. 13, 2012 (DE) .................. 20 2012 005 714 U

(51) Int. Cl.
*F16B 2/10* (2006.01)
*F16B 7/04* (2006.01)
*F16B 2/12* (2006.01)
(Continued)

(52) U.S. Cl.
CPC .............. *F16B 7/0473* (2013.01); *F16B 2/12* (2013.01); *F16B 7/187* (2013.01); *F24J 2/526* (2013.01); *F24J 2002/4661* (2013.01);
(Continued)

(58) Field of Classification Search
CPC ............ F16B 7/04; F16B 7/0473; F16B 2/10; F16B 2/065; F16B 2/12; F16B 2/18; Y10T 403/4671; Y10T 403/555; Y10T 403/7062; Y10T 403/7064; Y10T 403/7066; Y10T 403/7067
See application file for complete search history.

(56) References Cited

U.S. PATENT DOCUMENTS 4,901,963 A * 2/1990 Yoder .................... B25B 5/103
24/489
8,085,481 B2 * 12/2011 Hill .......................... G03B 3/00
248/229.24
(Continued)

FOREIGN PATENT DOCUMENTS

BE          1015540 A3 *  6/2005 ............ A47H 1/144
DE    20 2010 007 234 U1   10/2011
(Continued)

*Primary Examiner* — Daniel Wiley
(74) *Attorney, Agent, or Firm* — Norman B. Thot

(57) ABSTRACT

A holder for a profiled rail comprising a holding edge and a for carrier component includes a base body, a clamping element, a screw connection, and a rotary joint. The base body comprises a supporting surface configured to have the profiled rail be placed thereon, a holding-down strip which holds down the holding edge against the supporting surface, and a first opening. The clamping element comprises a second opening. The screw connection passes through the first and second opening and is fixable on the carrier component. The rotary joint comprises an axis of rotation arranged parallel to the supporting surface and to the holding-down strip. The clamping element clamps the profiled rail against the base body with the screw connection. On the base body, the clamping element is guided radially with respect to the axis of rotation between an open and a closed pivot position with the rotary joint.

15 Claims, 17 Drawing Sheets

(51) Int. Cl.
  *F16B 7/18* (2006.01)
  *F24J 2/52* (2006.01)
  *F24J 2/46* (2006.01)

(52) U.S. Cl.
  CPC ..... *Y10T 29/49828* (2015.01); *Y10T 29/49865* (2015.01); *Y10T 403/7067* (2015.01)

(56) References Cited

U.S. PATENT DOCUMENTS 9,086,185 B2 * 7/2015 Haddock ................ F16M 13/02
2008/0310913 A1    12/2008 Urban et al.
2012/0167364 A1 *  7/2012 Koch ...................... F16B 2/12
                                                   29/281.1
2013/0121760 A1 *  5/2013 Chen ..................... F16B 7/0473
                                                   403/362

FOREIGN PATENT DOCUMENTS

| EP | 2 009 293 A2 | 12/2008 |
| EP | 2 249 102 A2 | 11/2010 |
| EP | 2 256 353 A2 | 12/2010 |
| FR | 2 950 375 A1 | 3/2011  |

* cited by examiner

HOLDER FOR A PROFILED RAIL

CROSS REFERENCE TO PRIOR APPLICATIONS

This application is a U.S. National Phase application under 35 U.S.C. §371 of International Application No. PCT/DE2013/000315, filed on Jun. 13, 2013 and which claims benefit to German Patent Application No. 20 2012 005 714.6, filed on Jun. 13, 2012. The International Application was published in German on Dec. 19, 2013 as WO 2013/185747 A2 under PCT Article 21(2).

FIELD

The present invention relates to a holder for a profiled rail.

BACKGROUND

EP 2 009 293 A2 describes a holder for a profiled rail with a holding edge. The holder comprises a base/bodymain body, a clamping wedge and a screw connection. The base body has a supporting surface for the profiled rail, a holding-down strip protruding from the supporting surface and an inclined ramp. The clamping wedge is arranged on the ramp and is pulled into an open position by a rubber ring. The clamping wedge and the ramp are penetrated by the screw connection, wherein a round hole is contained in the clamping wedge and an elongated hole is contained in the ramp. The screw connection comprises a head screw and a nut. When the screw connection is actuated, the clamping wedge displaces the profiled rail parallel to the supporting surface until the holding edge passes under the holding-down strip and abuts against the latter. The holder is at the same time clamped against a carrier component by means of the screw connection, wherein the nut is arranged in an opening in the carrier component. The base body may be undesirably displaced out of the original installation position on the carrier component when the screw is tightened. The installation of the rubber ring by machine is complex. A main disadvantage is that the nut must be inserted in a previous step into the opening of the carrier component before the holder is placed onto the carrier component. As a result, the holder and the nut must be provided separately.

SUMMARY

An aspect of the present invention is to provide an alternative solution to the known holder. The holder is intended to be simple to manufacture by machine and to be able to be mounted simply and rapidly and to firmly and permanently hold the profiled rail.

In an embodiment, the present invention provides a holder for a profiled rail comprising a holding edge and a for carrier component which includes a base body, a clamping element, a screw connection, and a rotary joint. The base body comprises a supporting surface configured to have the profiled rail be placed thereon, a holding-down strip which holds down the holding edge against the supporting surface, and a first opening. The clamping element comprises a second opening. The screw connection passes through the first and second opening and is fixable on the carrier component. The rotary joint comprises an axis of rotation arranged parallel to the supporting surface and to the holding-down strip. The clamping element clamps the profiled rail against the base body with the screw connection. On the base body, the clamping element is guided radially with respect to the axis of rotation between an open pivot position and a closed pivot position with the rotary joint.

BRIEF DESCRIPTION OF THE DRAWINGS

The present invention is described in greater detail below on the basis of embodiments and of the drawings in which.

DETAILED DESCRIPTION

Figure 1:
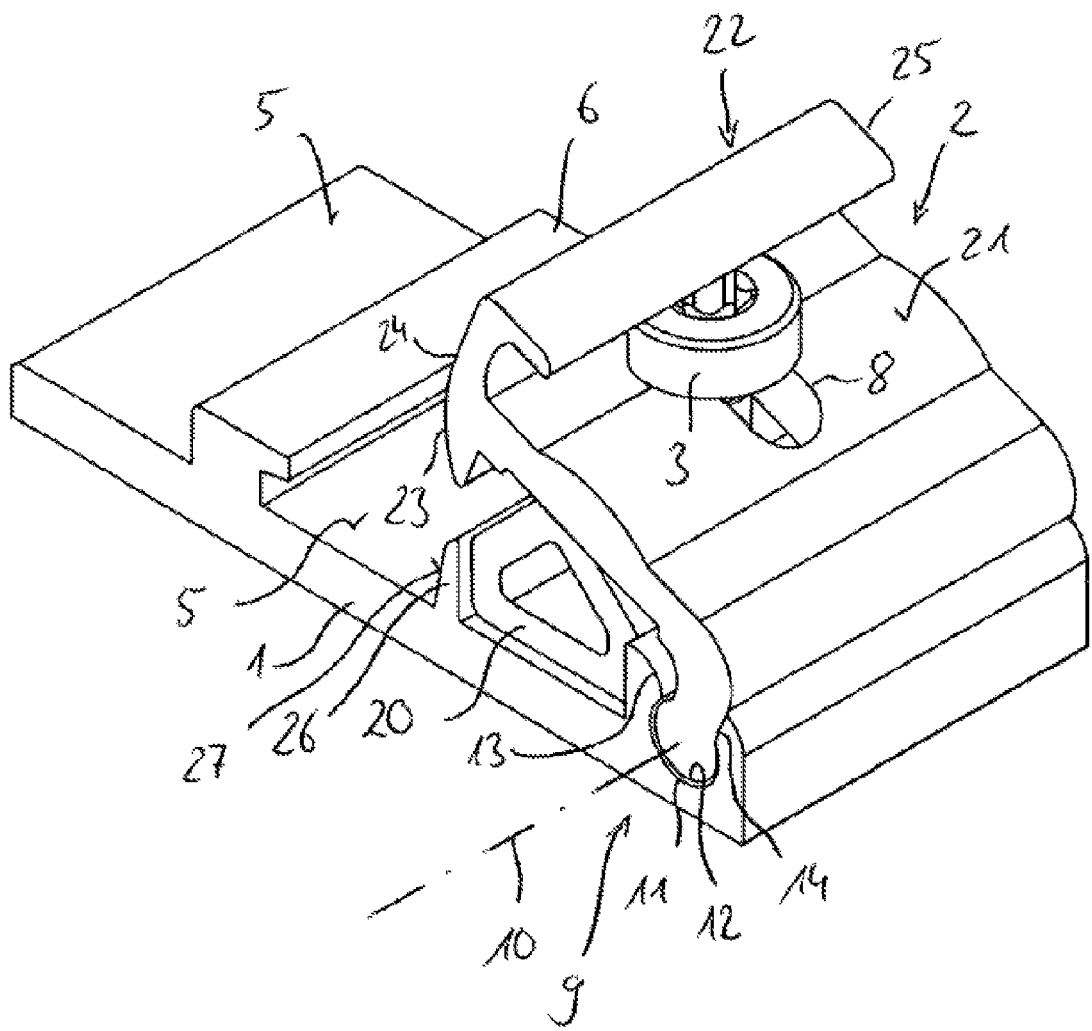
FIG. 1 shows a holder with a clamping element in an open pivoted position.
Figure 2:
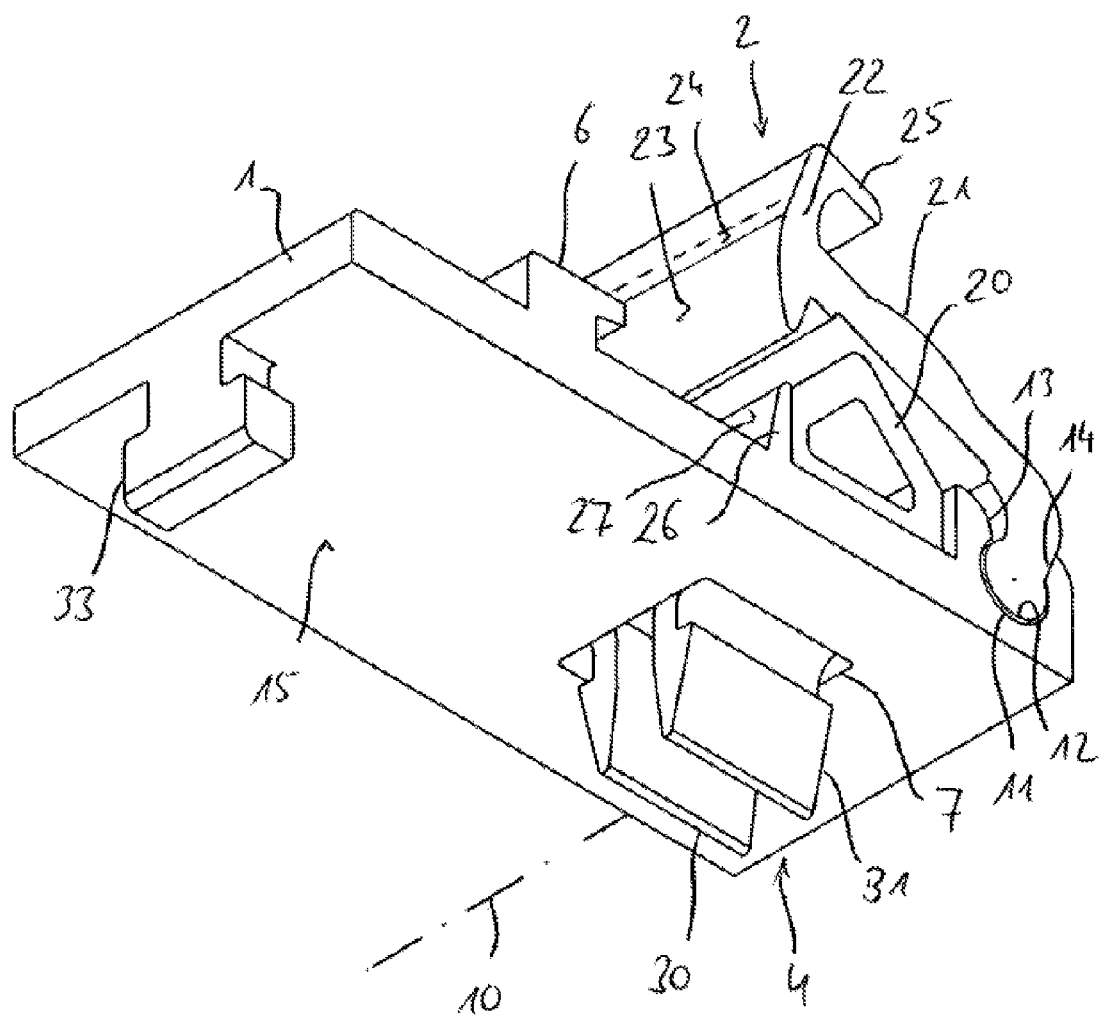
FIG. 2 shows a holder with a clamping element in an open pivoted position.

In an embodiment of the present invention, the holder is provided for a profiled rail, i.e., for clamping the profiled rail. The holder has a base body, a clamping element and a screw connection. The base body has a supporting surface which is provided for placing the profiled rail on. The base body also has a holding-down strip which is provided for holding down a holding edge of the profiled rail against the supporting surface. The base body additionally contains a first opening, and the clamping element contains a second opening. The screw connection leads through the second and the first opening and can be fastened on a carrier component. The clamping element can clamp the profiled rail against the base body by means of the screw connection. It is characteristic of the present invention that the holder has a rotary joint, and an axis of rotation of the rotary joint runs parallel to the supporting surface. The clamping element is guided radially with respect to the axis of rotation between an open pivoted position and a closed pivoted position by means of the rotary joint on the base body. The clamping element can, for example, not only be guided radially, but can also be held radially, with respect to the axis of rotation by means of the rotary joint. The clamping element can therefore no longer be readily radially detached from the base body, which is of particular advantage in the manufacturing process. In the open pivoted position, the profiled rail can be placed onto the supporting surface. In the closed pivoted position, the holding edge can be in engagement with the holding-down strip, and the profiled rail can be clamped firmly against the base body, in particular against the holding-down strip thereof. The holder affords advantages in respect of manufacturing, installation and ssta-bility and is suitable for profiled rails differing in cross section.

The rotary joint can be composed of a plurality of rotary joint partners, in particular two rotary joint partners, wherein one of the rotary joint partners is provided on the base body and the other joint partner is provided on the clamping element. The rotary joint partners can be an integral part of the base body and of the clamping element. The rotary joint partners are parallel to the holding-down strip. One of the rotary joint partners can, for example, be shaped concavely and the other rotary joint partner can, for example, be shaped convexly. The concave rotary joint partner can, in particular in sections, be a hollow-cylindrical receptacle for the convex rotary joint partner, wherein the convex rotary joint partner can have a cylindrical design in sections. The concave and the convex rotary joint partners are shaped in a corresponding manner for the purpose of rotary guidance and can have bearing play. Also conceivable are shapes which do differ from hollow cylinders and cylinders and which, when the clamping element is being pivoted, additionally force a translation, in particular in a direction parallel to the supporting surface and pointing toward the holding strip.

The rotary joint can be formed by means of a flexible strip, wherein the flexible strip is fixed at one end on the base body and at another end on the clamping element. The flexible strip can adopt a larger size in the direction of the axis of rotation than transversely thereto, i.e., can be bendable along its length. The flexible strip can have a predetermined buckling point which determines the axis of rotation. Such a predetermined buckling point can be identified by a weakening in the material thickness of the flexible strip. A rotary joint formed by means of a flexible strip can be what is referred to as a film hinge.

In a top view of the supporting surface or, in other words, in a perpendicular projection onto the supporting surface, the first opening can be arranged between the holding-down strip and the axis of rotation. This means that, in a top view of the supporting surface, the axis of rotation is arranged on a side of the first opening which faces away from the holding-down strip. That side of the first opening which faces away from the holding strip is, with regard to the top view, that side of the first opening with the largest distance from the holding-down strip. This arrangement saves on construction space and affords advantages in respect of the stability.

The axis of rotation can run between a first plane coinciding with the supporting surface, and a second plane which is parallel to the first plane, wherein a distance between the first plane and the second plane is smaller than or equal to twice the largest distance of the holding-down strip from the supporting surface. The perpendicular distance of the axis of rotation from the supporting surface is therefore smaller than twice the largest perpendicular distance of the holding-down strip from the supporting surface. This results in short distances from the supporting surface to the axis of rotation, which can afford advantages in respect of the stressing of the material. The distance between the first plane and the second plane can, for example, be smaller than the largest distance of the holding-down strip from the supporting surface. Given a suitable design of the rotary joint, the second plane can also be located on a side facing away from the supporting surface. The axis of rotation can, for example, be located on the same side of the supporting surface on which the holding strip is also arranged. The axis of rotation can also lie precisely in the first plane. The axis of rotation can also lie in a third plane which is parallel to the supporting surface and intersects the holding-down strip.

At least one rotary stop which delimits a pivoting range of the clamping element relative to the base body can be provided on the base body. A rotary stop can be provided in the opening direction of rotation and a rotary stop can be provided in the closing direction of rotation. Such rotary stops can be arranged on a rotary joint partner of the base body. The counter support, which is described further below, can also at the same time act as a rotary stop in the closing direction of rotation. A pivoting region of between 10 and 40 degrees, for example, between 15 and 30 degrees, can be advantageous.

The holder can contain a mechanical restraining device which prevents the clamping element from rotating out of the open pivoted position into the closed pivoted position. The mechanical restraining device can, in particular, be an irreversibly deformable stop against which the clamping element bears or by means of which the clamping element is supported against the base body. The mechanical restraining device can also be a snap-in device which can be overcome by manual force or at least by actuation of the screw connection. Such a latching device can consist of a latching depression and a latching extension engaging there, and can, for example, act directly between the rotary joint partners of the rotary joint. The mechanical restraining device permits simple placing of the profiled rails onto the supporting surface.

The holder can contain an elastic means which urges the clamping element in a direction toward the open pivoted position. The urging can take place by pulling or, for example, by pressing. The elastic means can, for example, act between clamping element and base body. The elastic means can be spatially arranged between the base body and the clamping element. The elastic means can be a rubber body which is compressed during the rotation into the closed pivoted position. Such a rubber body can, for example, have a round, oval or triangular cross section and can contain a recess. The elastic means can also be a curved leaf spring which acts with one side on the base body and with another side on the clamping element. The elastic means can also be a torsion spring which acts with one limb on the base body and with another limb on the clamping element. Such leaf or torsion springs can, for example, be composed of spring steel. The elastic means permit a simple placing on of the profiled rail and, in addition, has the effect that a clamping element, which is possibly already pivoted down before the profiled rail is placed thereon, is automatically urged in the direction of the open pivoted position. It is also possible to combine the rotary joint and the elastic means with each other, for example, by a pre-curved leaf spring which is inserted at one end in the base body and at the other end in the clamping element.

The clamping element can have a convex section on which the screw connection can act radially, i.e., the axis of the screw connection is radial with respect to the convex section. The convex section is provided on an upper side of the clamping element facing away from the first opening. A component of the screw connection, in particular a screw head or a nut with a straight contact surface, can abut tangentially on the convex section. It is of advantage here that the screw connection is loaded axially and that undesirable transverse forces or bending moments which could obstruct the installation or impair the stability do not occur. The convex section can, for example, be designed so that the screw connection can there radially act over the entire pivoting region of the clamping element, but at least in the range of the closed pivoted position. In the direction parallel to the axis of rotation, the convex section can be straight or can also be arched. The convex section can, for example, be arranged around the second opening.

The clamping element can have a front end/end face which is provided for abutting on the profiled rail. The front end can, for example, be provided not only for abutting the profiled rail, but also for forcing the profiled rail against the holding-down strip, in particular in a direction parallel to the supporting surface. The front end can have a convexly rounded sliding region which, when the clamping element is being pivoted down, can slide on the profiled rail. The convexly rounded sliding region can make it easier to place the profiled rail on and acts as a joining aid. The convexly rounded sliding region can thus make it easier to pivot the clamping element down and can avoid scratches on the profiled rail.

The front end can alternatively or additionally have an abutting region which, in the closed pivoted position, is perpendicular to the supporting surface. The abutting region can be part of the convexly rounded sliding region. The abutting region can also be flat and adjacent to the convexly rounded sliding region and can in particular merge tangentially or otherwise continuously into the latter. The abutting region is that section of the front end which, in the closed pivoted position, can abut directly and effectively against the profiled rail. The abutting region can directly push or clamp the profiled rail against the holding-down strip, in particular in a direction parallel to the supporting surface.

The clamping element can have a fixing means which carries the screw connection when the clamping element is being pivoted down. This saves an installation step and facilitates the installation. Such a fixing means is particularly advantageous if the screw connection contains the first anchoring element which is described further below. The fixing means can be a simple holding-down means for a screw head or a nut, which holding-down means can be integrally formed at the front end of the clamping element.

The base body can have a counter support by means of which the clamping element can be supported opposite to a clamping direction, wherein the clamping element comes into contact with the counter support only when the clamping element is pivoted down. The clamping direction can, for example, be parallel to the supporting surface and point away from the holding-down strip. The counter support can be contained as a depression in the base body or, like the holding strip, can protrude therefrom. Like the holding-down strip, the counter support can be formed in a linear manner, for example, as a groove or strip, and can run parallel to the holding-down strip. The counter support can be provided integrally on the base body. The counter support blocks or at least obstructs a translation of the clamping element opposite to the clamping direction. A rotary joint can thereby be relieved of load. The counter support can, for example, be a rigid design and be arranged spatially between the holding strip and the first opening. A joining bevel can, for example, be provided on the counter support and/or the clamping element. Such a joining bevel permits relatively large dimensional tolerances and makes it easier to pivot the clamping element down.

The clamping element can have an extension which comes into contact with the counter support when the clamping element is pivoted down. The extension can come into contact with the counter support on a side of the counter support that faces the holding-down strip. The previously described front end of the clamping element can be shaped as such an extension. It can alternatively be provided that the clamping element has a depression in which the counter support enters into engagement when the clamping element is pivoted down.

A clamping slant which forces the clamping element in the clamping direction when the latter is pivoted down can be provided on the counter support and/or the clamping element. It is expedient for this purpose if the rotary joint has radial play. This measure can increase the strength of the clamping connection and shorten the path of the force flux through the base body, in particular if the counter support is provided between the first opening and the holding-down strip.

The clamping element can be of an angular design so that an intermediate space is formed between the first opening and the second opening. The clamping element can in particular be of a right angled design. In the closed pivoted position, a vertical section can, for example, be provided so as to be substantially perpendicular to the supporting surface and a parallel section is provided substantially parallel to the supporting surface. The parallel section can have the second opening and the convex section. The intermediate space can be used as a construction space for further elements of the holder, in particular for the elastic means and a first anchoring element which is described further below.

In an embodiment, the screw connection can have a screw and a nut. The nut can be provided for insertion in an opening in the carrier component. The screw can, for example, be a head screw which acts on the clamping element. The nut is located on the side of the rear surface of the base body. The nut can be inserted by being slid in, swiveled in, rotated in, or a combination thereof. The nut can also be a "hammer head nut" or a rhombic nut.

The screw connection can alternatively have a threaded shaft and a nut. The threaded shaft can be fastened to a carrier component. The nut can in particular be a sleeve nut and can act on the clamping element. It can additionally be provided that the screw connection merely has a threaded shaft and a nut. The threaded shaft can be fastened directly to the carrier component. The nut can in particular be a sleeve nut and can act on the clamping element.

The screw connection can have a screw and a first anchoring element, wherein the anchoring element has two snap-action hooks, which are directed outward in an opposed manner, for engaging behind an opening in the carrier component, and the anchoring element can have an internal thread means with which the screw is in threaded engagement. A advantage of such a screw connection is that, in contrast to the prior art, the holder can be completely preassembled. Separate provision of a nut and previous insertion thereof into an opening in the carrier component are additionally obviated. The opening in the carrier component can in particular be a slot which can be engaged behind. The carrier component can, for example, be a supporting rail and the opening an undercut groove which is contained in the supporting rail and is undercut. The snap-action hooks can have inserting bevels on the outside for simpler insertion into the opening. The first anchoring element can, for example, have a square outside cross section in the region of the internal thread means.

The internal thread means can be provided integrally in the first anchoring element as an internal thread. It can be advantageous for this purpose to equip the screw with a self-cutting thread so that the internal thread can be produced in one working step together with the screw being screwed in. It is additionally possible for the internal thread means to be embodied by a nut in the anchoring element. For this purpose, the anchoring element can have a receptacle for the nut in which receptacle the nut is also accommodated in a manner secure against rotation.

The screw can act as a counter support for the snap-action hooks by, upon being tightened, moving between the snap-action hooks and blocking a movement with respect to each other. The first anchoring element can be accommodated in the first opening in the base body in a manner secure against rotation. For this purpose, the first opening can, for example, have a rectangular, in particular a square, cross section.

The base body can have an extension which protrudes from the rear surface and which can interact with the carrier component in order to secure the base body against rotation. The extension can engage in the same opening of the carrier component as the screw connection.

The base body can have a rear side which faces away from the supporting surface. A second anchoring element can be provided, which anchoring element protrudes from the rear surface and is provided for engaging behind an opening in the carrier component. The stability of the fastening of the holder to the carrier component is increased by the second anchoring element. The second anchoring element can, for example, be L-shaped or, for example, T-shaped, and can be fastened to the base body. The second anchoring element can, for example, engage in the same opening as the screw connection, in particular the first anchoring element. For this purpose, the opening in the carrier component can be a slot which can be engaged behind. The second anchoring element can also dissipate torque and act as a means of securing against rotation.

The base body, the clamping element, and the rotary joint can be formed together integrally. It is, for example, conceivable for the base body and the clamping element including the rotary joint to consist of a single formed part made from metal or of a single injection molded part made from plastic.

The base body, the clamping element, and/or a component of the screw connection can in each case be formed homogeneously as a single piece. Such a component of the screw connection can be the first anchoring element described further below.

The base body, the clamping element, and/or part of the screw connection can in each case have an extrudable basic shape. Extrudable means cylindrical in the geometrically general sense. The base body, the clamping element, and/or a component of the screw connection can as a result already be produced in the basic shape thereof by cutting off from an extruded strand. The extrudable basic shape differs from the actual design by means of openings which are inserted transversely with respect to an extrusion direction of the extrudable basic shape. The component of the screw connection can be the first anchoring element described further below.

The present invention also relates to an installation system with the holder and the profiled rail. The profiled rail can have a groove which is undercut on one side or on both sides and the edge of the groove, which can be engaged behind, is the holding edge for the holding-down strip. Alternatively or additionally, the profiled rail can have a holding edge which is directed outward with respect to the profiled rail. The profiled rail can, for example, be free from a holding edge protruding from the profiled rail.

The installation system can contain the carrier component. The carrier component can have a protruding threaded pin which is part of the screw connection. In addition to the protruding threaded pin, the screw connection can contain a nut, in particular a sleeve nut, which acts on the clamping element. The carrier component can contain an opening on which the screw connection can be fixed. The opening can, for example, be an internal thread or an opening which can be engaged behind, in particular a longitudinal opening. The carrier component can, for example, be a supporting rail which contains an undercut groove as the opening.

The present invention also relates to an installation method for prefixing the holder on a carrier component having an opening which can be engaged behind. The installation method is characterized by the following steps: a) placing the holder onto the carrier component so that the first anchoring element projects into the opening which can be engaged behind, and b) pivoting the clamping element down and with pressing the first anchoring element into the opening which can be engaged behind. The pressing-in operation takes place until the first anchoring element engages behind the opening which can be engaged behind. For the simultaneous pivoting down of the clamping element and pressing in of the anchoring element, the abovementioned holding-down means for the screw connection can, for example, be provided.

A further installation method for prefixing a holder on a carrier component having a slot which can be engaged behind is characterized by the following steps: a) inserting the second anchoring element into the slot which can be engaged behind, b) moving the holder so that the first anchoring element projects into the slot which can be engaged behind, wherein the second anchoring element at the same time engages behind the slot which can be engaged behind, and c) pivoting the clamping element down and with pressing the first anchoring element into the slot which can be engaged behind. The pressing-in operation takes place until the first anchoring element engages behind the opening which can be engaged behind. For the simultaneous pivoting down of the clamping element and pressing in of the anchoring element, the abovementioned holding-down means for the screw connection can, for example, be provided.

The above installation methods can expediently be supplemented by the fact that, after the pivoting-down operation, the clamping element automatically pivots up by means of the elastic means, that is to say, again comes into an open pivoted position.

The present invention also relates to an installation method for fastening the profiled rail having a holding edge to the holder. The installation method is characterized by the following steps: a) placing the profiled rail onto the supporting surface, wherein the holding edge and the holding-down strip come into an opposite position, and b) tightening the screw connection, as a result of which the clamping element is pivoted down, and the profiled rail is clamped against the base body, in particular against the holding-down strip by means of the clamping element. During or even before step b), the holding edge can, for example, enter into engagement with the holding-down strip. The installation method can follow the above methods for prefixing the holder, as a result of which the holder is also clamped on the carrier component.

The present invention also relates to an arrangement with a holder and a profiled rail having a holding edge, wherein the profiled rail is placed onto the supporting surface of the holder, and the holding edge of the profiled rail is held down against the supporting surface, and the profiled rail is clamped against the base body by means of the clamping element. The present invention also relates to an arrangement with a holder and a carrier component, wherein the holder is prefixed on the carrier component by means of the screw connection. The present invention also relates to a cross connection between the profiled rail and the supporting rail by means of the holder, wherein the holder rests at the rear surface thereof on the supporting rail, and the first anchoring element and optionally the second anchoring element engage behind the undercut groove of the supporting rail.

The holder is suitable particularly for profiled rails which do not have an outwardly directed holding edge or which do not contain an undercut groove on the side perpendicular to the supporting surface. The holder can, for example, be used for profiled rails which have a rectangular basic cross section, and which have undercut grooves exclusively on two sides facing away from each other, wherein one groove is directed toward the supporting side of the base body. If there is an outwardly directed holding edge, the clamping element can alternatively, for example, additionally, press the holding edge perpendicularly against the supporting surface.

The present invention is explained in more detail below under reference to the drawings.

The holder illustrated in FIGS. 1-17 is provided for clamping a profiled rail 50 and has a base body/main body 1, a clamping element 2, and a screw connection 3, 4. The base body 1, the clamping element 2 and the anchoring element 4 are in each case formed homogeneously as a single piece and in each case have an extrudable basic shape. The base body 1 has a supporting surface 5 which is provided for placing the profiled rail 50 on. The profiled rail 50 contains an undercut groove 54 with the holding edge 51. The base body 1 also has a holding-down strip 6 which is provided for holding down the holding edge 51 of the profiled rail 50. The holding-down strip 6 protrudes from the supporting surface 5 and divides the supporting surface 5 into two partial surfaces which are approximately the same in size. The holding-down strip 6 contains a receiving groove 16 which is provided for receiving the holding edge 51 of the profiled rail 50. The receiving groove 16 is open in a direction toward the clamping element 2.

The base body 1 contains a first opening 7 which is rectangular. The clamping element 2 contains a second opening 8 which is designed as an elongated hole and runs transversely with respect to the holding-down strip 6. The first opening 7 and the second opening 8 mostly lie one above the other in a direction perpendicular to the supporting surface 5. The screw connection 3, 4 is composed of a head screw 3 and a first anchoring element 4. The screw connection 3, 4 leads through the second opening 8 and the first opening 7 and is fixable on a supporting rail 52 by means of the first anchoring element 4. The clamping element 2 can clamp the profiled rail 50 against the base body 1, i.e., against the holding-down strip 6 thereof, by means of the screw connection 3, 4.

It is characteristic that the holder has a rotary joint 9, and a geometrical axis of rotation 10 of the rotary joint 9 runs parallel to the supporting surface 5 and to the holding-down strip 6. The axis of rotation 10 is illustrated by a chain-dotted line or can be seen as a point in a top view. The clamping element 2 is guided and also held radially with respect to the axis of rotation 10 between an open pivoted position according to FIG. 1 and a closed pivoted position according to FIG. 4 by means of the rotary joint 9 on the base body 1. The clamping element 2 can thereby be joined to the base body 1, and optionally released again, for example, only by a translation in the direction of the axis of rotation 10.

Figure 5:
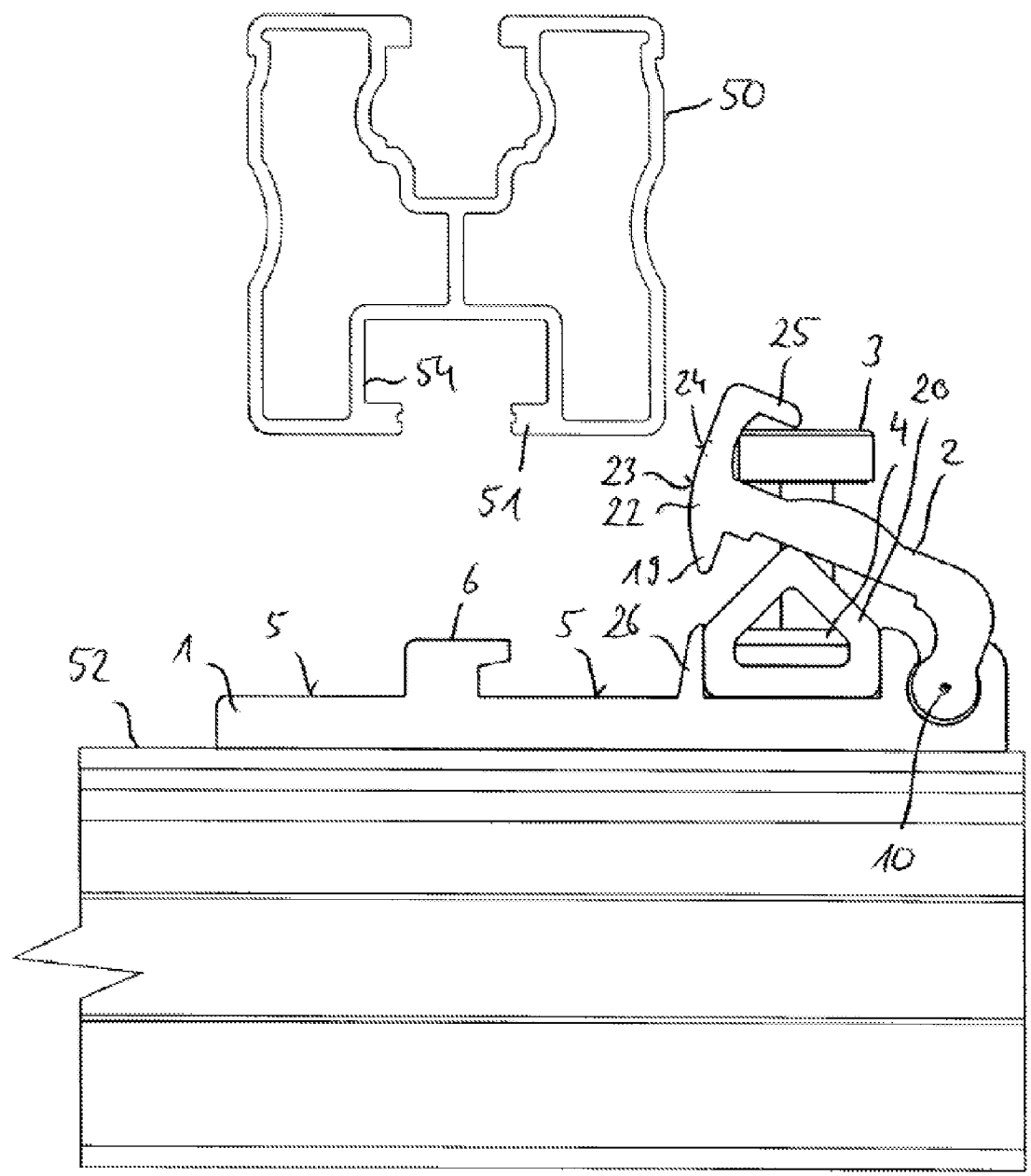
FIG. 5 shows an installation step of an arrangement with the holder according to FIG. 1.
Figure 6:
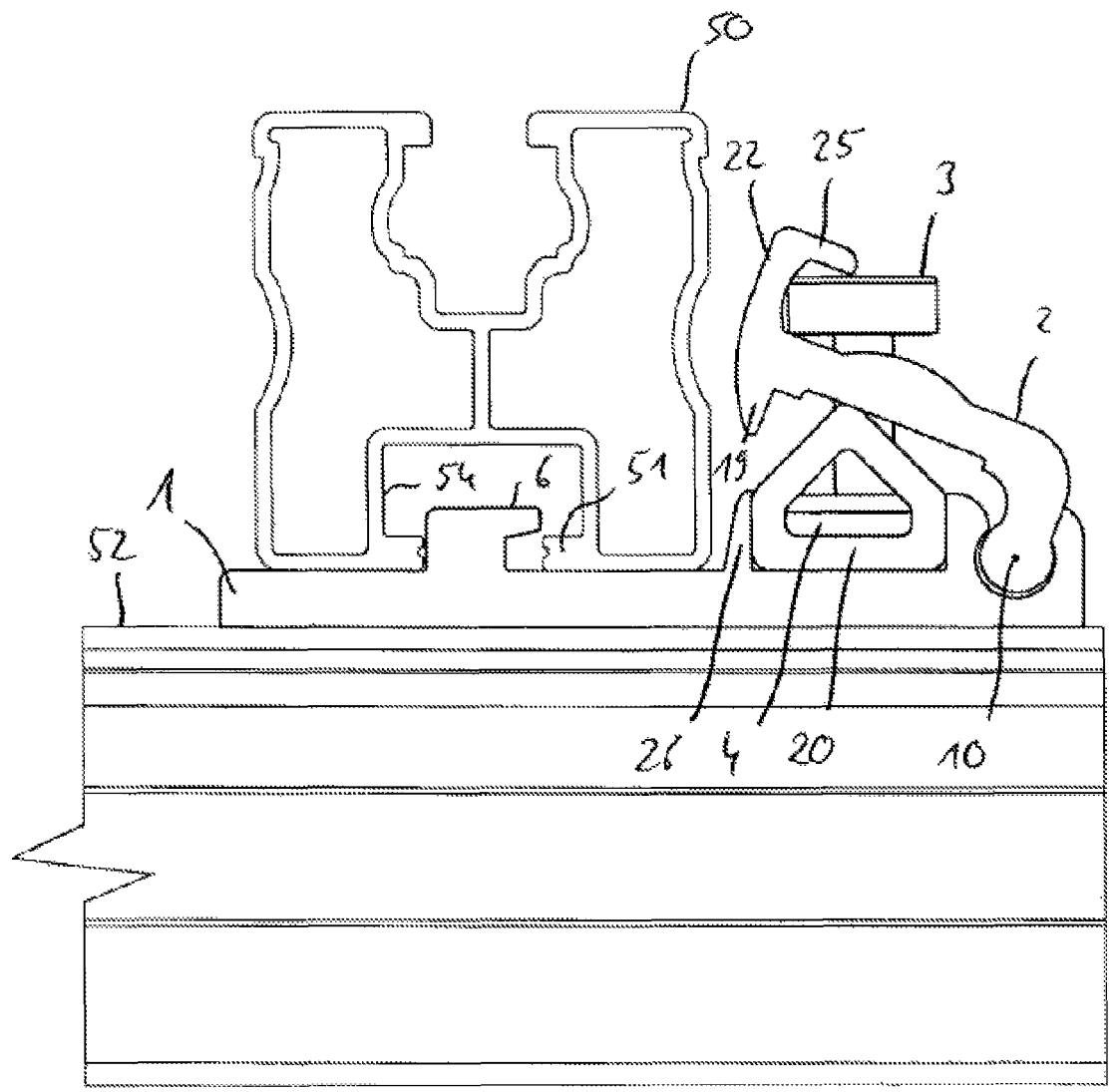
FIG. 6 shows an installation step of an arrangement with the holder according to FIG. 1.
Figure 7:
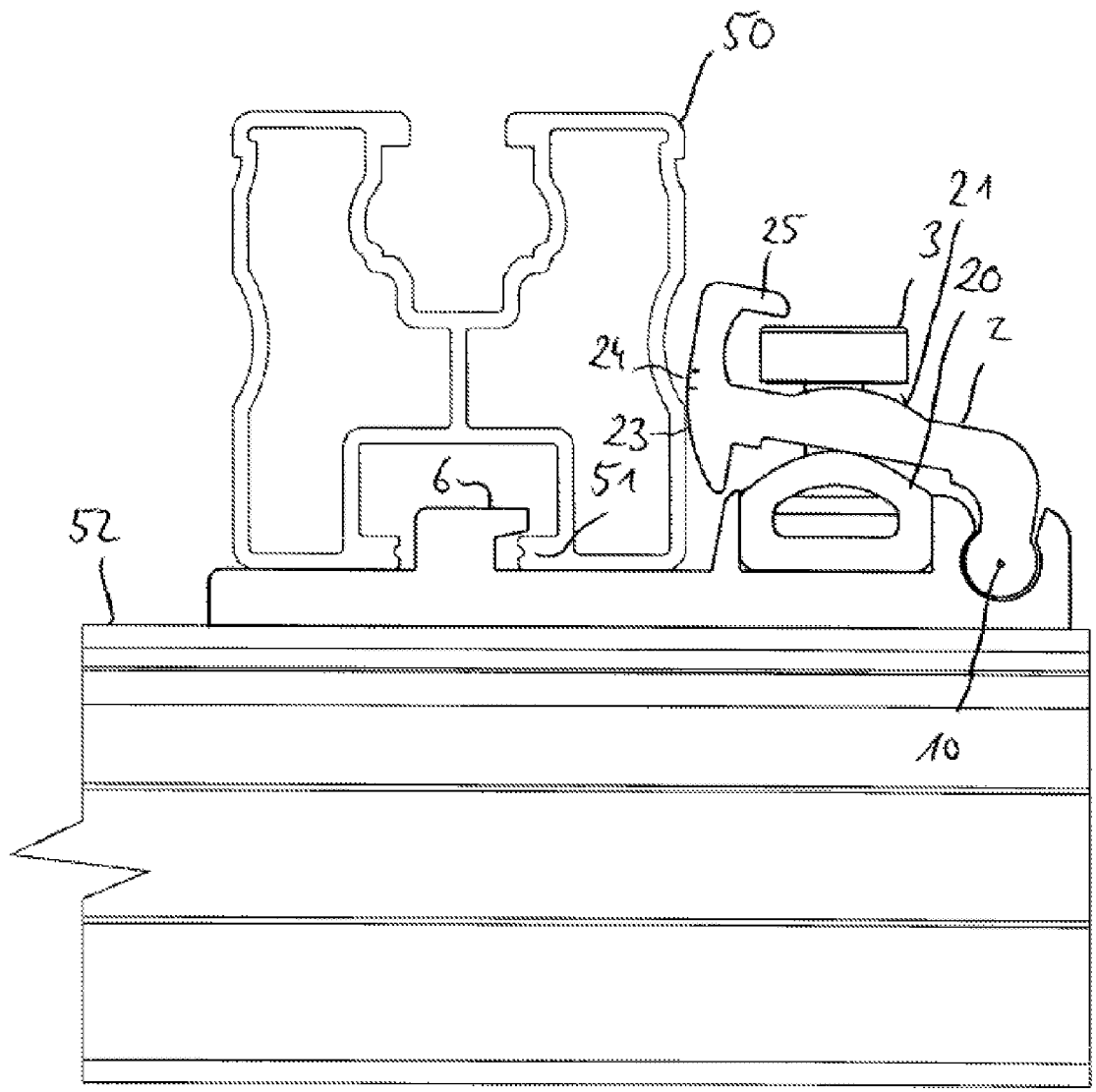
FIG. 7 shows an installation step of an arrangement with the holder according to FIG. 1.
Figure 8:
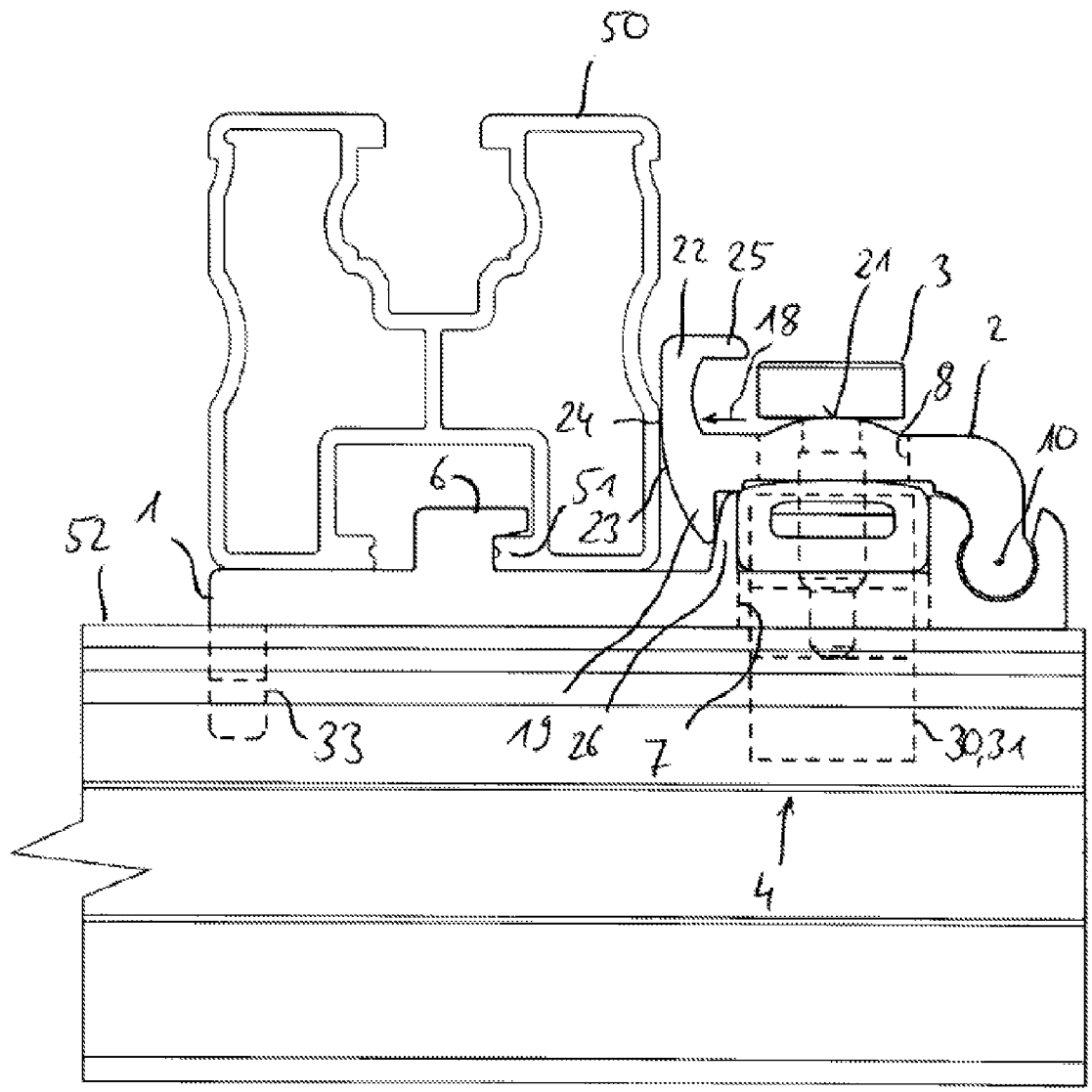
FIG. 8 shows an installation step of an arrangement with the holder according to FIG. 1.

In the open pivoted position according to FIG. 5, the profiled rail 50 can be placed onto the supporting surface. In the closed pivoted position according to FIG. 4, the holding edge 51 can be in engagement with the holding-down strip 6. As a result, the holding-down strip 6 and therefore the profiled rail 50 can be held down fixedly against the supporting surface 5, as is apparent from FIG. 8. In the closed pivot position according to FIG. 4, the profiled rail 50 can be clamped against the base body 1, i.e., against the holding-down strip 6 thereof, as is also apparent from FIG. 8. The holding edge 51 is pressed against the base of the receiving groove 16.

The rotary joint 9 is composed of two rotary joint partners 11 and 12, wherein a concave rotary joint partner 11 is provided integrally on the base body 1 and a convex rotary joint partner 12 is provided integrally on the clamping element 2. The concave rotary joint partner 11 has a section-wise cylindrical design, and the convex rotary joint partner 12 has a section-wise cylindrical design. As can be seen in particular from FIGS. 3 and 4, the rotary joint partners 11 and 12 correspond in shape, wherein suitable bearing play is provided Like the axis of rotation 10, the rotary joint partners 11 and 12 are oriented parallel to the holding-down strip 6 and the supporting surface 5.

Figure 3:
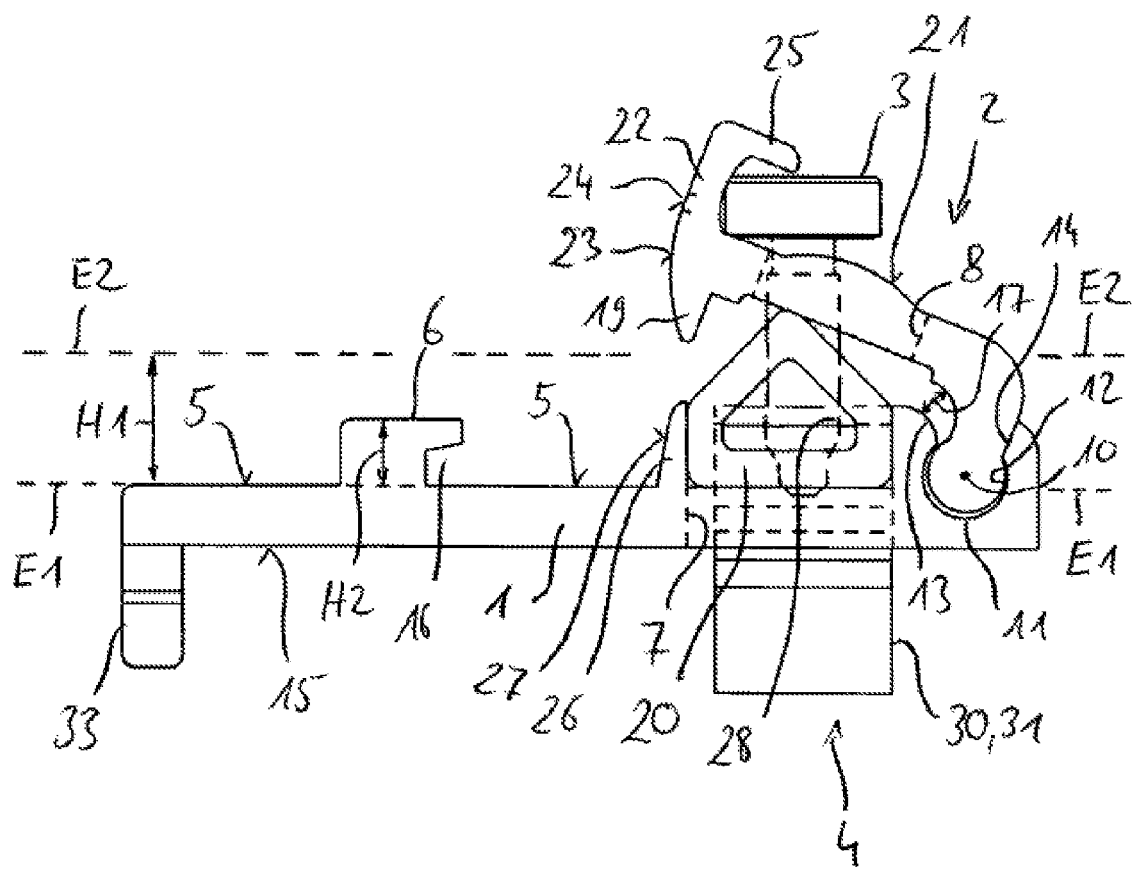
FIG. 3 shows a holder with a clamping element in an open pivoted position.
Figure 4:
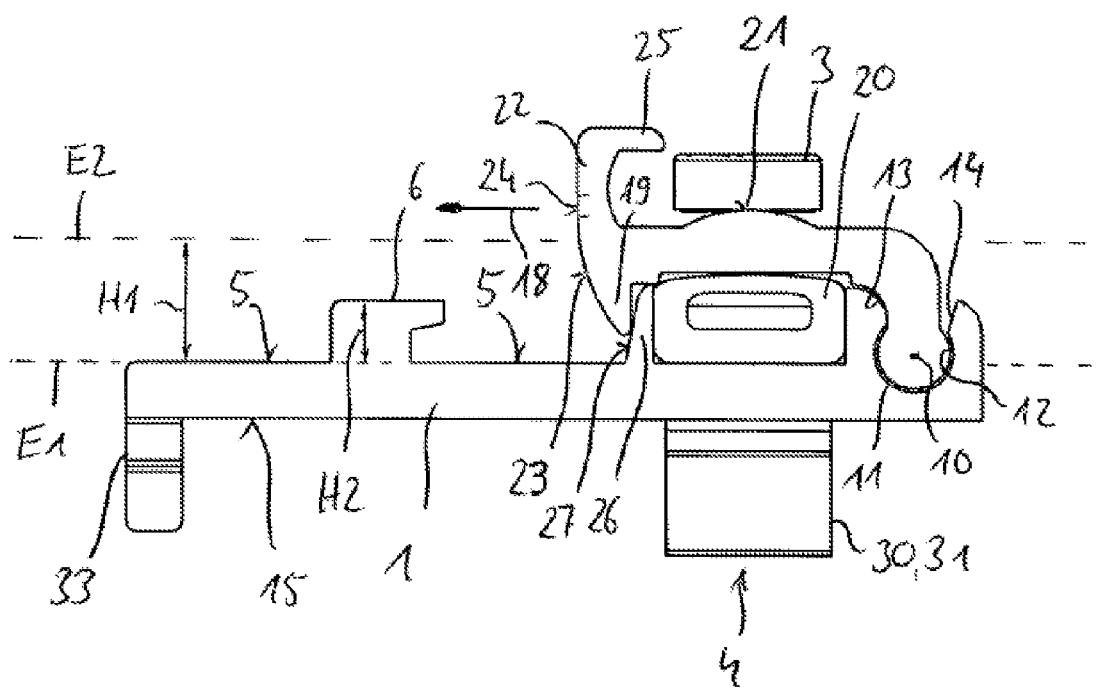
FIG. 4 shows the holder according to FIG. 1 with the clamping element in a closed pivoted position.

As can be gathered from FIG. 3, in a top view of the supporting surface 5, the first opening 7 is arranged between the holding-down strip 6 and the axis of rotation 10. In addition, the axis of rotation 10 runs between a first plane E1 coinciding with the supporting surface 5 and a second plane E2 parallel to the first plane E1, wherein a distance H1 between the first plane E1 and the second plane E2 is approximately equal to twice the largest distance H2 of the holding-down strip 6 from the supporting surface 5. The distance H1 can also be smaller than twice the distance H2. In other words, the perpendicular distance of the axis of rotation 10 from the supporting surface 5 is smaller than twice the largest perpendicular distance of the holding-down strip 6 to the supporting surface 5. In the present exemplary embodiment, the axis of rotation 10 is provided particularly close to the first plane E1, and therefore a third plane, which is parallel to the supporting surface and in which the axis of rotation lies, intersects the holding-down strip. The axis of rotation 10 and the holding-down strip 6 are located on the same side of the supporting surface 5.

Two rotary stops 13 and 14 which delimit the pivoting range 17 of the clamping element 2 relative to the base body 1 are provided on the base body. The rotary stop 13 delimits the pivoting range 17 in the closing direction of rotation, and the rotary stop 14 delimits the same in the opening direction of rotation. The two rotary stops 13 and 14 are adjacent to the concave rotary joint partner 11 on the base body 1. The counter support 26 which is described further below also acts at the same time as a rotary stop in the closing direction of rotation. The pivoting range 17 is approximately 22 degrees.

The counter support 26 has an elastic means 20 which is provided as a rubber body. The elastic means 20 presses the clamping element 2 into the open pivoted position according to FIG. 3. This preload has the effect that a clamping element 2, which has already been pivoted down possibly before the profiled rail 50 is placed on, is automatically urged again in the direction of the open pivoted position. The elastic means 20 is inserted directly between the base body 1 and the clamping element 2 and acts directly thereupon. The elastic means 20 designed as a rubber body, is compressed during the pivoting down from the open pivoted position into the closed pivoted position. In the present exemplary embodiment, the rubber body has an approximately triangular hollow cross section.

The clamping element 2 has a convex section 21 on which the screw connection 3, 4, i.e., the head screw 3, can act radially. The axis of the screw connection 3, 4 is radial to the convex section 21. On the upper side of the clamping element 2, which side faces away from the first opening 7, the convex section 21 is provided in the region around the second opening 8. At the end of the pivoting-down operation, the screw head 3 can bear with the straight lower side thereof tangentially against the convex section 21, as is apparent from FIG. 7 and FIG. 8. As a result, the screw connection 3, 4 is solely loaded axially. The convex section 21 around the second opening 8 is of rectilinear design in the direction parallel to the axis of rotation 10.

The clamping element has a front end/end face 22 in the shape of a shield or hammer head, which is provided for direct action upon the profiled rail 1, i.e., on an outer side of the profiled rail 1, which outer side is perpendicular to the supporting surface 5. With the front end 22, the profiled rail 1 is acted upon against the holding-down strip 1 i.e., in a direction parallel to the supporting surface. The front end 22 has a convexly rounded slide region 23 which slides along the profiled rail 50 when the clamping element 2 is pivoted downward. The convexly rounded slide region 23 acts in particular as a joining aid. The front end also has an abutting region 24 which, in the closed pivoted position, is perpendicular to the supporting surface 5. In this exemplary embodiment, the abutting region 24 is of flat design and merges tangentially into the convexly rounded slide region 23. As can be seen from FIG. 8, the abutting region 24 is that section of the front end 22 which, in the closed pivoted position, abuts effectively and directly on the profiled rail 1, i.e., against the outer side of the profiled rail 1, which outer side is perpendicular to the supporting surface 5. The profiled rail 1 is therefore clamped against the holding-down strip 6 by means of the abutting region 24.

The clamping element 2 has a fixing device 25 which carries the screw connection 3, 4 when the clamping element 2 is being pivoted down. The fixing device 25 is arranged at the front end 22 and is designed as a simple holding-down means which carries the head of the head screw 3 downward when the clamping element 2 is pivoted down.

A counter support 26, by means of which the clamping element 2 can be supported opposite to the clamping direction 18, is provided on the base body 1, wherein the clamping element 2 comes into contact with the counter support 26 only when the clamping element 2 is being pivoted down. For this purpose, the clamping element 2 has an extension 19 at the front end 22. The extension 19 comes into contact with the counter support 26 on a side of the counter support 26 that faces the holding-down strip 6. The clamping direction 18 is directed parallel to the supporting surface and from the axis of rotation 10 to the holding-down strip 6. The counter support 26 is designed in a linear manner as a rigid strip and, like the holding-down strip 6, protrudes from the supporting surface 5. The counter support 26 runs parallel to the holding-down strip 6. The counter support 26 blocks, or at least obstructs, a possible translation of the clamping element 2 opposite to the clamping direction 18. The counter support 26 is arranged between the holding-down strip 6 and the first opening 7. In the upper end region of the counter support 26 there is a joining bevel which makes it easier to come into contact with the clamping element 2.

A clamping slant 27 is provided on the counter support 26, the clamping slant 27 is pointing toward the holding-down strip 6 and is forcing the clamping element 2 in the clamping direction 18 when the latter is being pivoted down. During the pivoting-down operation, the extension 19 slides along the clamping slant 27 and, as it approaches the closed pivot position, is increasingly forced in the clamping direction 18. For this purpose, it is expedient if the rotary joint partners 11 and 12 have radial bearing play with respect to each other which permits such a translation. The path of the force flux from the clamping element 2 into the base body 1 is thereby substantially shortened and no longer has to take place solely via the rotary joint 9.

The clamping element 2 is of an angled design, i.e., an approximately right-angled design, and so that an intermediate space is formed between the first opening 7 and the second opening 8. The clamping element 2 thus contains (with respect to the closed pivoted position and the supporting surface 5) a vertical section which leads to the rotary joint partner 12, and a horizontal section which contains the second opening 7, bears the convex section and finally leads to the front end 22. The elastic means 20 is arranged in the intermediate space. The first anchoring element 4 is also partially accommodated in the intermediate space.

Figure 9:
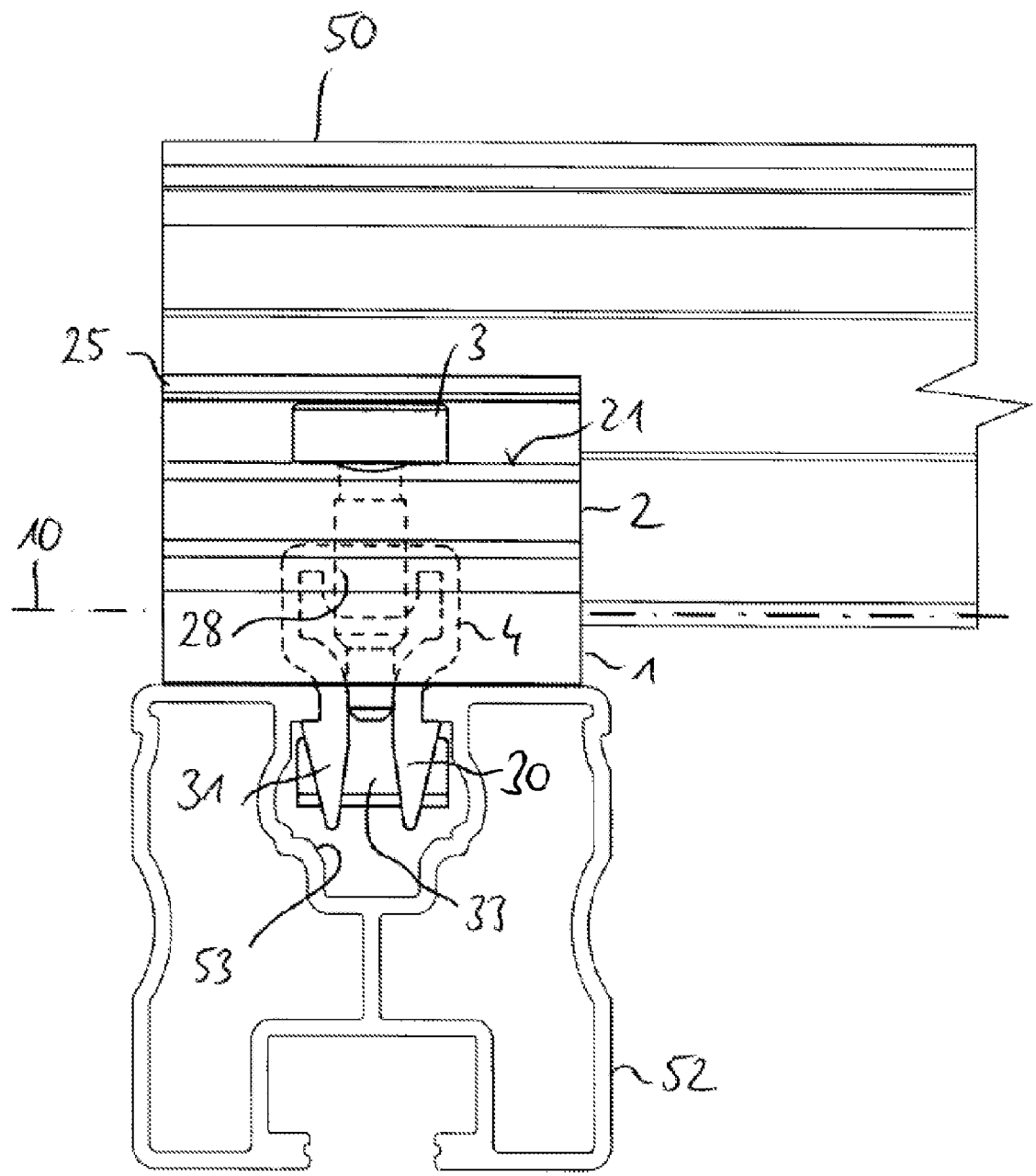
FIG. 9 shows a rear view of the arrangement according to FIG. 8.
Figure 10:
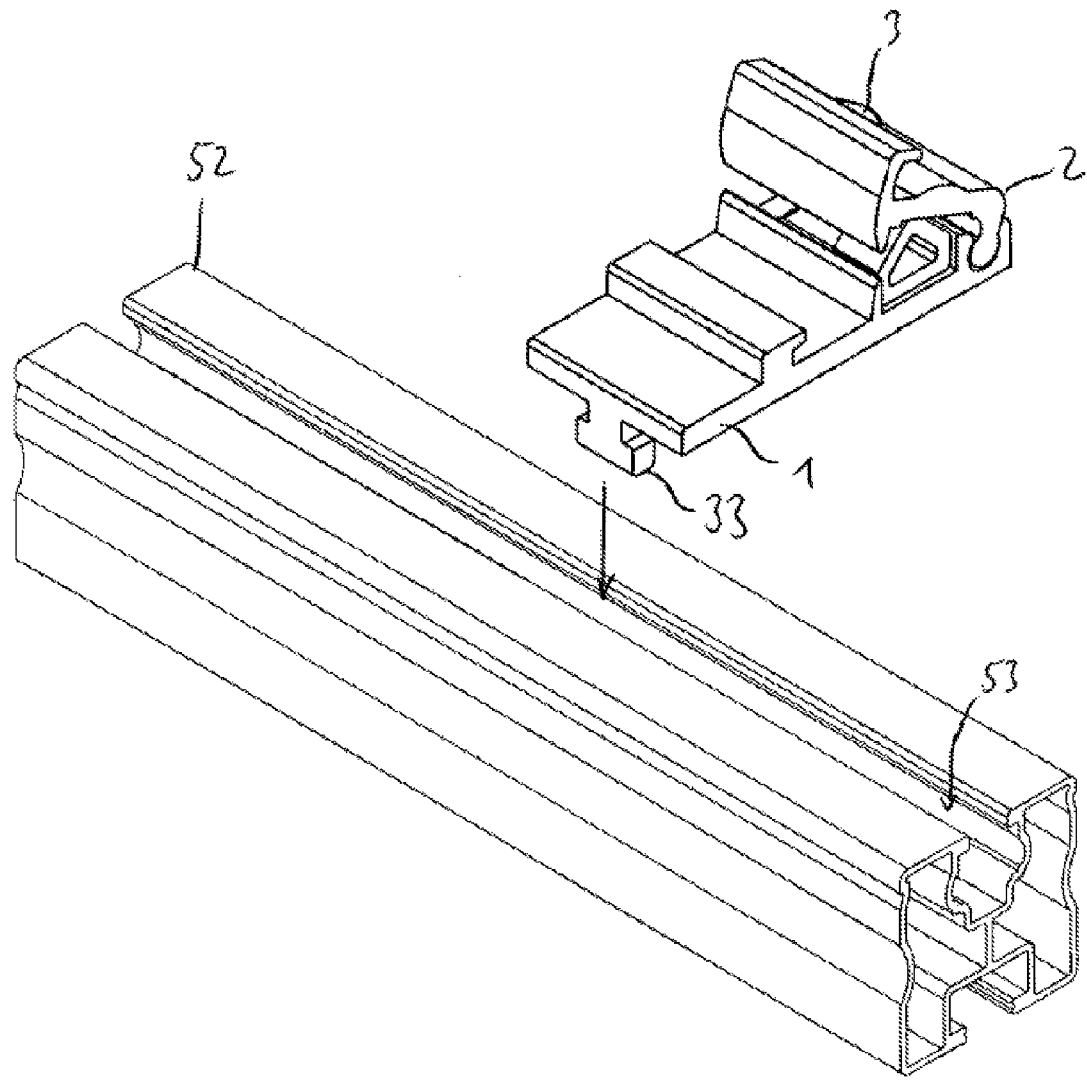
FIG. 10 shows an installation step of an arrangement with the holder according to FIG. 1.
Figure 11:
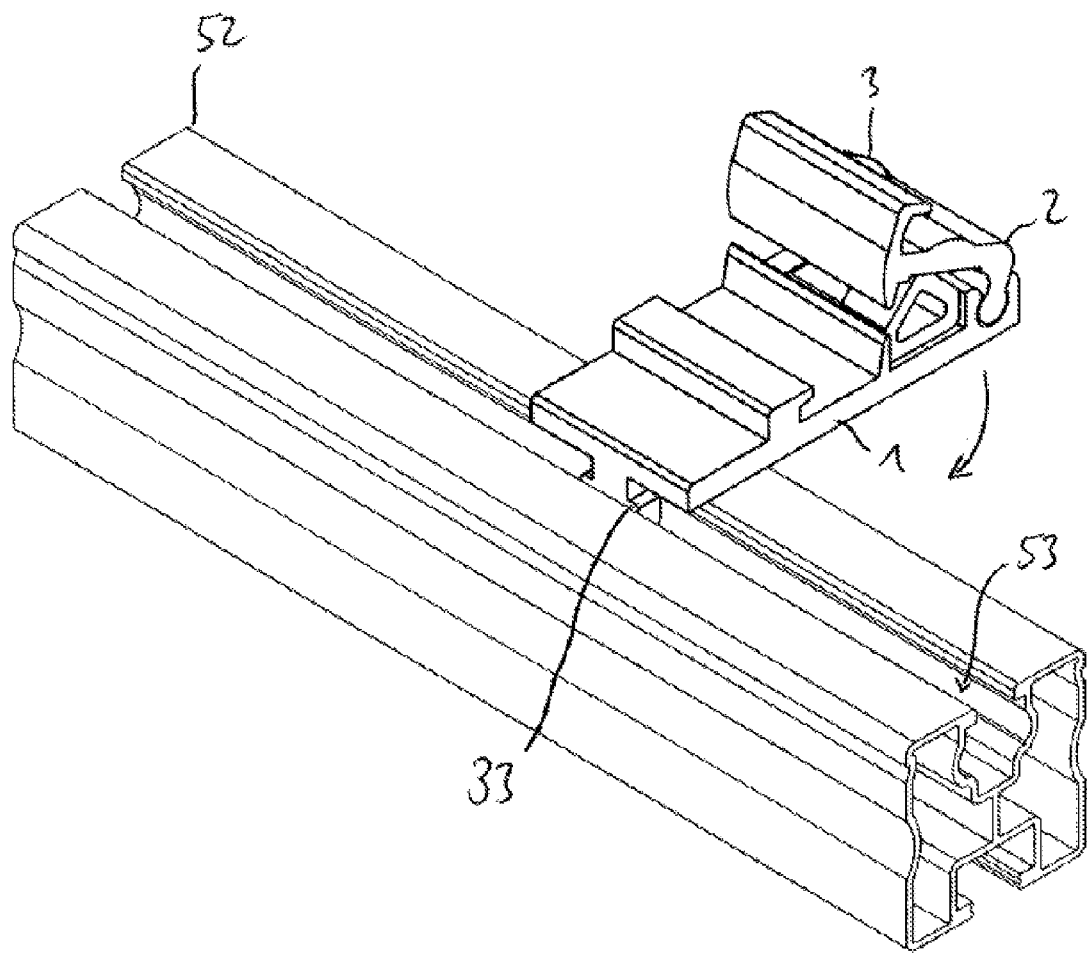
FIG. 11 shows an installation step of an arrangement with the holder according to FIG. 1.
Figure 12:
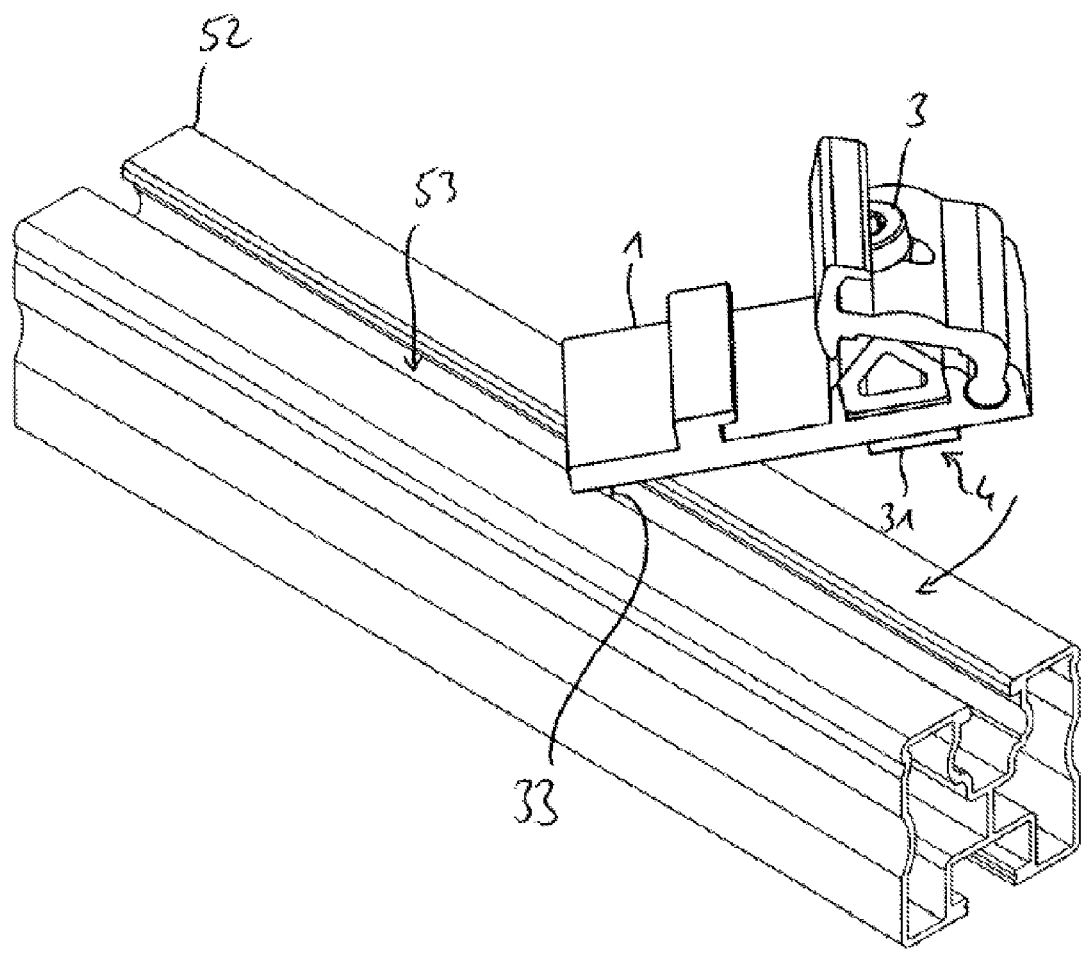
FIG. 12 shows an installation step of an arrangement with the holder according to FIG. 1.
Figure 13:
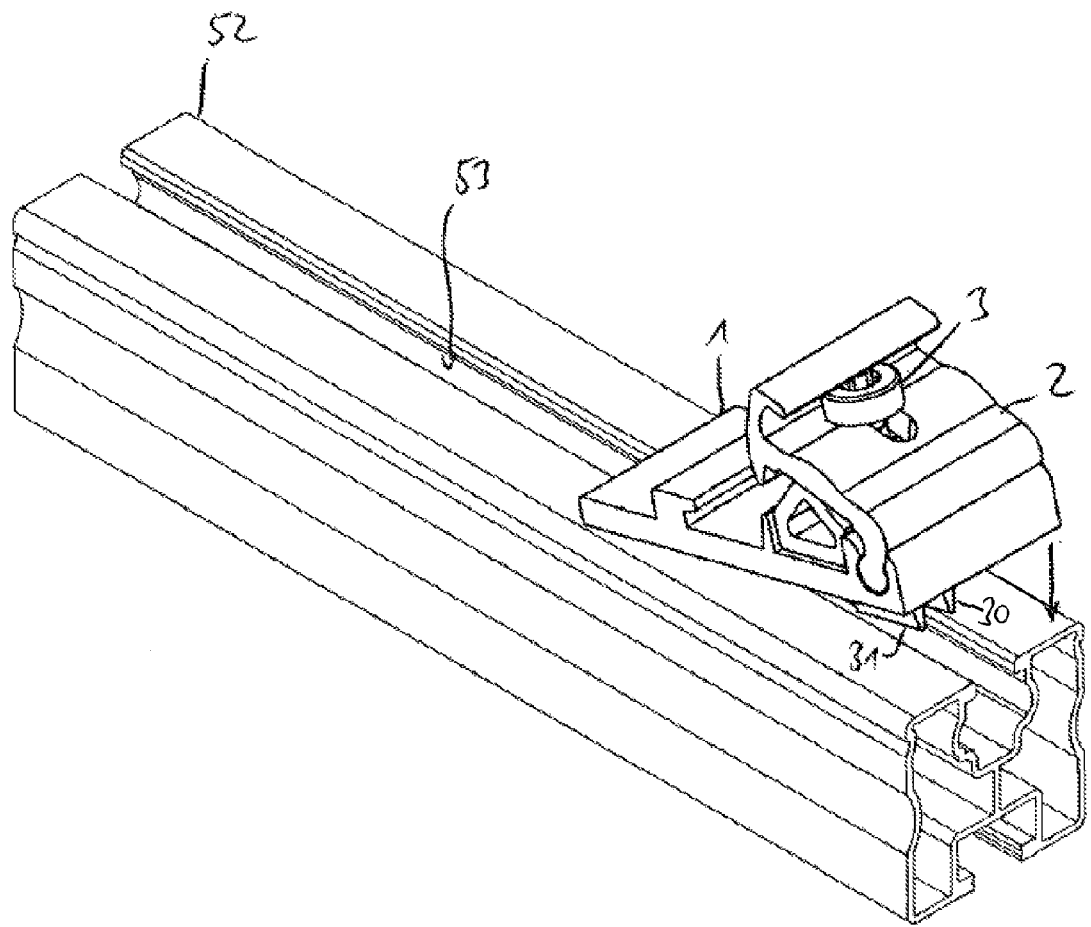
FIG. 13 shows an installation step of an arrangement with the holder according to FIG. 1.
Figure 14:
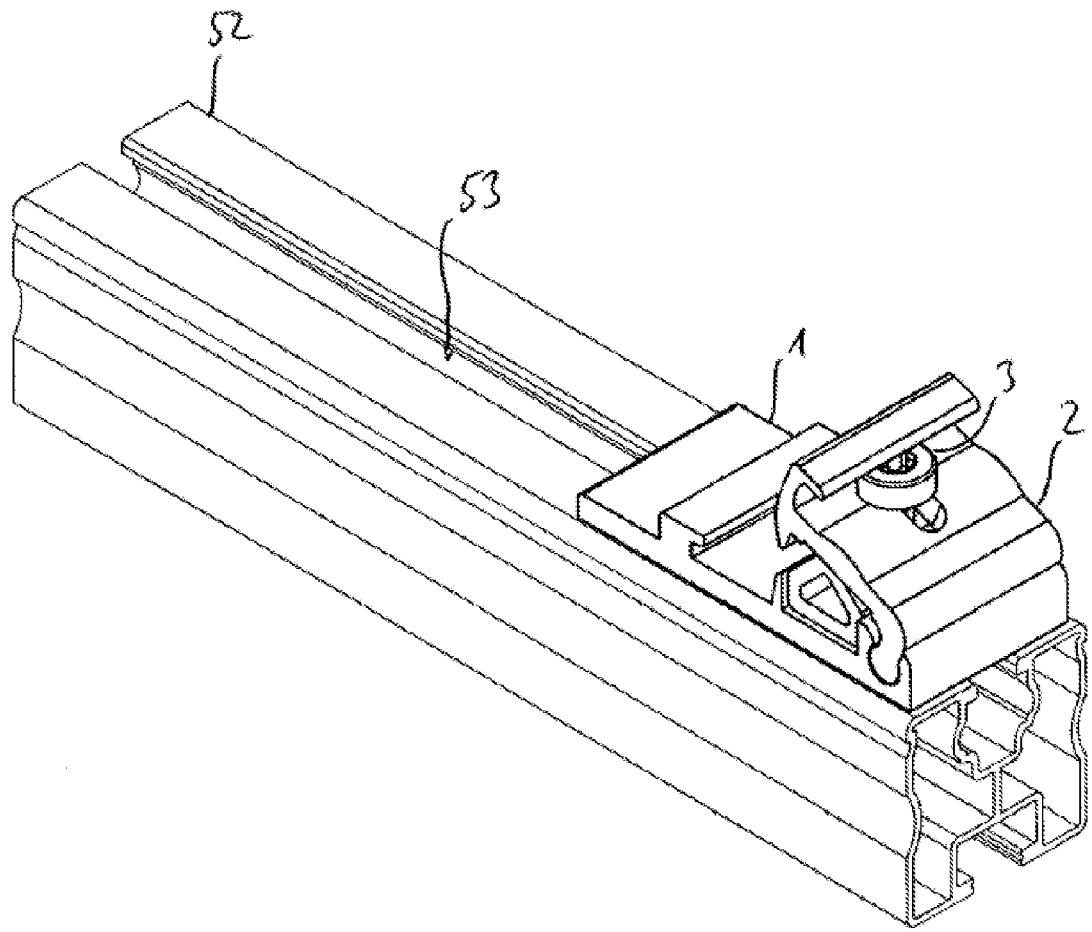
FIG. 14 shows an installation step of an arrangement with the holder according to FIG. 1.
Figure 15:
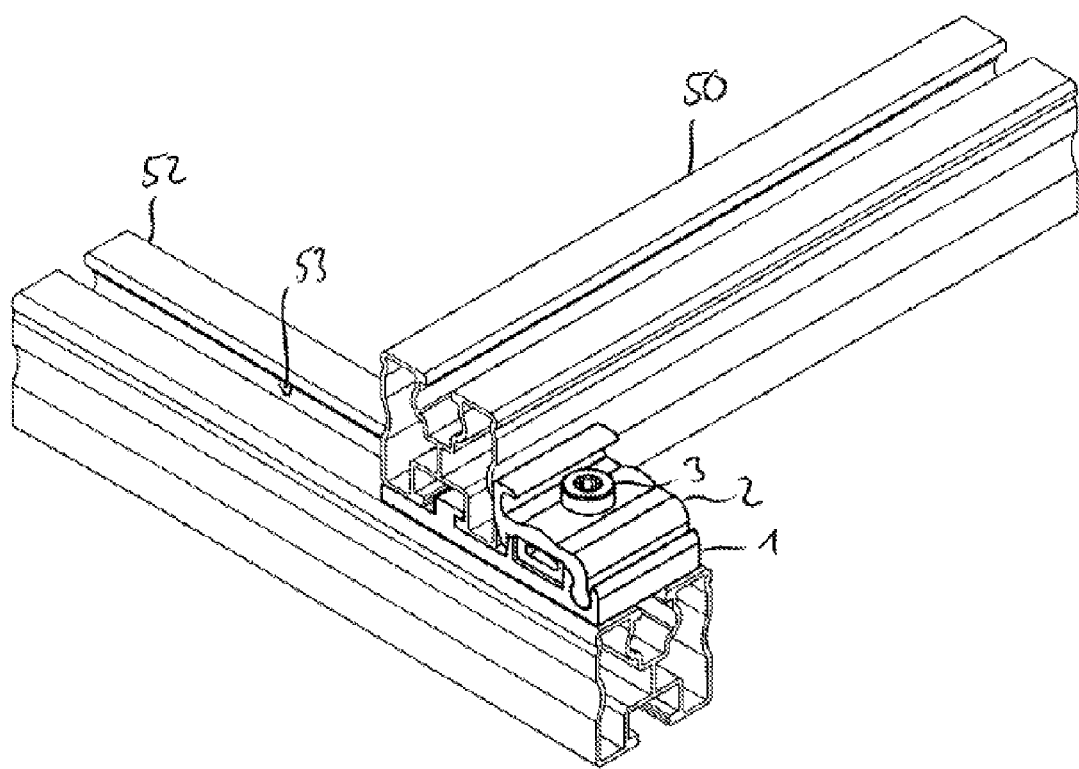
FIG. 15 shows an installation step of an arrangement with the holder according to FIG. 1.
Figure 16:
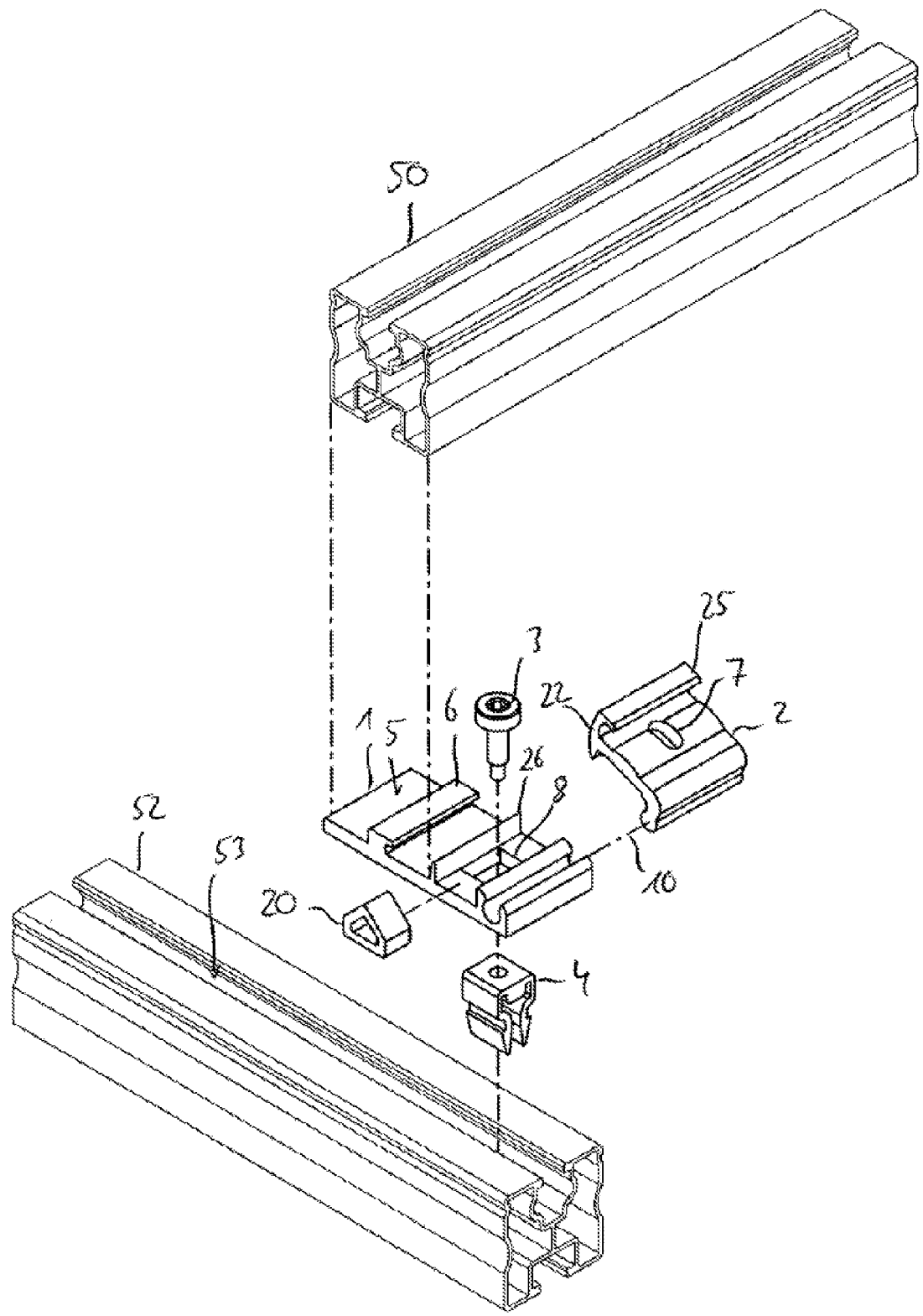
FIG. 16 shows an exploded view of the arrangement according to FIG. 15.
Figure 17:
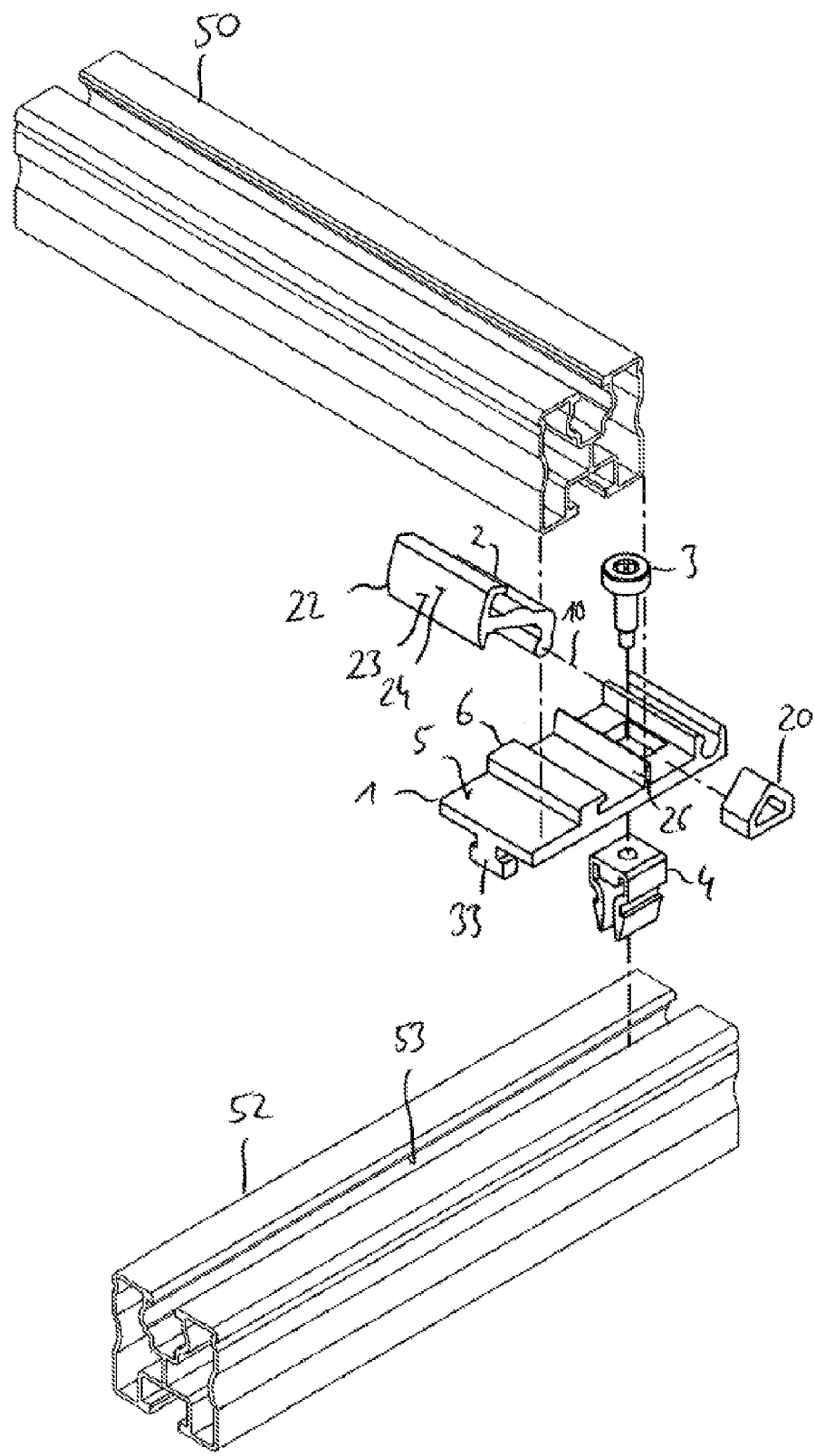
FIG. 17 shows an exploded view of the arrangement according to FIG. 15.

As shown in particular in FIG. 9, the first anchoring element 4 has two snap-action hooks 30 and 31 which are directed outward in an opposed manner and are provided for engaging behind an undercut groove 53 in the supporting rail 52. The first anchoring element 4 has an internal thread 28 which is in threaded engagement with the head screw 3. The snap-action hooks 30 and 31 have insertion bevels in order to be able to press the first anchoring element 4 more easily into the undercut groove 53. The first anchoring element 4 has a square outside cross section in the region of the internal thread 28 and is held in the first opening 7 in a manner secure against rotation. The internal thread 28 can, for example, be driven into the first anchoring element 4 by means of the head screw 3. For this purpose, the head screw 3 can have a self-cutting thread (not illustrated specifically). For high stability, the head screw 3 must act at the same time as a counter support for the snap-action hooks 30 and 31, as is apparent from FIG. 9. When the head screw 3 is tightened, the latter passes between the snap-action hooks 30 and 31 and blocks a possible movement toward each other, so that a release of the first anchoring element 4 can be precluded.

The base body 1 has a rear side 15 which faces away from the supporting surface and is provided for abutting on the supporting rail 52. A second anchoring element 33 which is provided for engaging behind the undercut groove 53 in the supporting rail 52 protrudes from the rear side 15. The second anchoring element 33 is rigid and T-shaped. The second anchoring element 33 engages in the same undercut groove 53 as the first anchoring element 4.

It is apparent from FIGS. 5-8 that the profiled rail 1 is first of all placed onto the support surface 5 of the holder, which is already pre-positioned on the supporting rail 52, wherein the holding-down strip 6 and the holding edge 51 comes into an opposite position. The head screw 3 is subsequently actuated, as a result of which the clamping element 2 is being pivoted down, the profile rail 1 is clamped against the holding-down strip 6 by means of the clamping element 2 and, in addition, the holding edge 51 enters further into engagement with the holding-down strip 6. During the pivoting-down operation of the clamping element 2 or during the clamping operation, the profiled rail 1 is parallel-displaced on the supporting surface 5 until the profiled rail strikes against the holding-down strip 6 and is acted upon the latter. During the parallel displacement, the holding edge 51 enters into engagement with the holding-down strip 6. As the closed pivoted position is increasingly reached, the profiled rail is increasingly pressed against the holding-down strip 6.

It is apparent from FIGS. 10-15 that the following installation steps can be performed in order to prefix the holder on the supporting rail 52: a) inserting the second anchoring element 33 into the undercut groove 53, b) moving the holder so that the first anchoring element 4 projects into the undercut groove 53, wherein the second anchoring element 33 increasingly engages behind the undercut groove 53 at the same time, and c) pivoting the clamping element 2 down with the first anchoring element 4 pressing into the undercut groove 53. The pressing-in operation takes place until the first anchoring element 4 completely engages behind the undercut groove 53.

The first anchoring element 4 is pressed in by means of the fixing device 25 which carries the head screw 3.

The present invention is not limited to embodiments described herein; reference should be had to the appended claims.

What is claimed is:

1. A holder connecting a profiled rail having an undercut groove with a holding edge and a carrier component having an opening, the holder comprising:
    a base body comprising:
        a supporting surface on a first end of the base body,
        a holding-down strip protruding from and dividing the supporting surface, and comprising a receiving groove configured to receive the holding edge of the profiled rail against the supporting surface, and
        a first opening;
    a clamping element comprising a second opening;
    a screw connection passing through each of the first opening and the second opening and fixable on the carrier component; and
    a rotary joint between the clamping element and a second end of the base body, the rotary joint comprising an axis of rotation arranged parallel to each of the supporting surface and the holding-down strip,
    wherein, with the profiled rail positioned against the supporting surface with the holding-down strip received within the undercut groove, the clamping element is pivotable about the axis of rotation between:
        an open pivoted position, wherein the clamping element is pivoted away from the supporting surface and the holding down edge of the profiled rail is distal to the receiving groove, and
        a closed pivoted position, wherein the clamping element is pivoted towards the supporting surface, and drives the profiled rail perpendicular to the axis of rotation such that the holding edge is moved into engagement with the receiving groove of the holding-down strip.

2. The holder as recited in claim 1, wherein the first opening is arranged between the holding-down strip and the axis of rotation when viewed from a top view of the supporting surface.

3. The holder as recited in claim 1, wherein,
    the axis of rotation is arranged between a first plane coinciding with the supporting surface and a second plane parallel to the first plane, and
    a first distance between the first plane and the second plane ≤twice of a largest distance of the holding-down strip from the supporting surface.

4. The holder as recited in claim 1, further comprising an elastic device configured to urge the clamping element towards the open pivoted position.

5. The holder as recited in claim 1, wherein the clamping element further comprises a convex section configured to have the screw connection act radially thereon.

6. The holder as recited in claim 1, wherein the clamping element further comprises a front end configured to abut on the profiled rail, the front end comprising a convexly rounded slide region which is configured to slide on the profiled rail when the clamping element is pivoted downwards.

7. The holder as recited in claim 1, wherein the clamping element further comprises a front end configured to abut on the profiled rail, the front end comprising an abutting region which is perpendicular to the supporting surface in the closed pivoted position.

8. The holder as recited in claim 1, wherein the clamping element further comprises a fixing device configured to carry the screw connection when the clamping element is pivoted downwards.

9. The holder as recited in claim 1, wherein,
    the base body further comprises a counter support which is configured so that the clamping element is supportable opposite to a clamping direction, and
    the clamping element contacts the counter support when the clamping element is pivoted downwards.

10. The holder as recited in claim 9, further comprising a clamping slant arranged on at least one of the counter support and the clamping element, the clamping slant being configured to force the clamping element in the clamping direction when pivoted downwards.

11. The holder as recited in claim 1, wherein the clamping element is provided as an angular design so as to form an intermediate space between the first opening and the second opening.

12. The holder as recited in claim 1, wherein,
    the screw connection comprises a screw and a first anchoring element, and
    the first anchoring element comprises two snap-action hooks which are arranged so as to extend outward in an opposed manner to each other, the two snap-action hooks being configured to engage behind the opening in the carrier component, and an internal thread configured to be in a threaded engagement with the screw.

13. The holder as recited in claim 12, wherein the base body further comprises,
    a rear side facing away from the supporting surface, and
    a second anchoring element protruding from the rear side, the second anchoring element being configured to engage behind the opening in the carrier component.

14. An installation method for prefixing the holder as recited in claim 13 on a carrier component comprising a slot configured to be engaged behind, the method comprising:
    inserting the second anchoring element into the slot;
    moving the holder so that the first anchoring element projects into the slot and so that the second anchoring element engages behind the slot; and
    pivoting the clamping element down with pressing the first anchoring element into the slot.

15. The installation method as recited in claim 14, wherein,
    the holder further comprises an elastic device configured to urge the clamping element towards the open pivoted position, and
    the method further comprises, after the pivoting of the clamping element down so that the first anchoring element is pressed into the slot, automatically pivoting up the clamping element with the elastic device.

* * * * *